(12) United States Patent
Ferguson et al.

(10) Patent No.: US 8,948,954 B1
(45) Date of Patent: Feb. 3, 2015

(54) MODIFYING VEHICLE BEHAVIOR BASED ON CONFIDENCE IN LANE ESTIMATION

(75) Inventors: David Ian Ferguson, San Francisco, CA (US); Dmitri Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/420,652

(22) Filed: Mar. 15, 2012

(51) Int. Cl.
*G05D 1/00* (2006.01)
*G06F 7/00* (2006.01)

(52) U.S. Cl.
USPC .................... 701/23; 701/24; 701/28; 701/41

(58) Field of Classification Search
CPC ..................................................... B62D 15/029
See application file for complete search history.

(56) References Cited

U.S. PATENT DOCUMENTS

| | | | | |
|---|---|---|---|---|
| 5,410,346 A * | 4/1995 | Saneyoshi et al. | ............ | 348/116 |
| 5,572,428 A * | 11/1996 | Ishida et al. | .................. | 701/301 |
| 5,790,403 A * | 8/1998 | Nakayama | ....................... | 701/28 |
| 6,327,536 B1 * | 12/2001 | Tsuji et al. | ..................... | 701/301 |
| 6,820,006 B2 * | 11/2004 | Patera | ........................... | 701/301 |
| 6,859,731 B2 * | 2/2005 | Takafuji et al. | ............... | 701/301 |
| 7,167,799 B1 * | 1/2007 | Dolgov et al. | ................... | 701/301 |
| 7,363,151 B2 * | 4/2008 | Nomura et al. | ............... | 701/445 |
| 8,184,859 B2 * | 5/2012 | Tanji | ............................. | 382/104 |
| 8,284,995 B2 * | 10/2012 | Diaz et al. | ..................... | 382/104 |
| 8,473,144 B1 * | 6/2013 | Dolgov et al. | ................... | 701/28 |
| 2002/0183929 A1 * | 12/2002 | Tsuji et al. | ..................... | 701/301 |
| 2003/0060969 A1 * | 3/2003 | Waite et al. | .................... | 701/117 |
| 2006/0206243 A1 * | 9/2006 | Pawlicki et al. | .................. | 701/1 |
| 2006/0220912 A1 * | 10/2006 | Heenan et al. | ................ | 340/933 |
| 2007/0069874 A1 * | 3/2007 | Huang et al. | .................. | 340/435 |
| 2007/0203617 A1 * | 8/2007 | Haug | ................................ | 701/1 |
| 2007/0210953 A1 * | 9/2007 | Abraham et al. | ............... | 342/29 |
| 2008/0162027 A1 * | 7/2008 | Murphy et al. | ............... | 701/117 |
| 2008/0262721 A1 * | 10/2008 | Guo et al. | ..................... | 701/208 |
| 2009/0048750 A1 * | 2/2009 | Breed | ............................. | 701/70 |
| 2009/0055095 A1 * | 2/2009 | Urban et al. | .................. | 701/301 |
| 2009/0067675 A1 * | 3/2009 | Tan et al. | ..................... | 382/104 |
| 2009/0102630 A1 * | 4/2009 | Nordlund | ...................... | 340/436 |
| 2009/0164080 A1 * | 6/2009 | Kurata et al. | ................... | 701/70 |
| 2009/0299573 A1 * | 12/2009 | Thrun et al. | ..................... | 701/41 |
| 2009/0306881 A1 * | 12/2009 | Dolgov et al. | ............... | 701/200 |
| 2010/0034422 A1 * | 2/2010 | James et al. | .................. | 382/103 |
| 2010/0082195 A1 * | 4/2010 | Lee et al. | ........................ | 701/25 |
| 2010/0106356 A1 * | 4/2010 | Trepagnier et al. | ............. | 701/25 |
| 2010/0114416 A1 * | 5/2010 | Au et al. | .......................... | 701/23 |
| 2010/0145552 A1 * | 6/2010 | Herman et al. | .................. | 701/3 |
| 2010/0148948 A1 * | 6/2010 | Murphy et al. | ............... | 340/435 |
| 2010/0168965 A1 * | 7/2010 | Doerr et al. | ..................... | 701/45 |
| 2010/0228420 A1 * | 9/2010 | Lee | ................................. | 701/26 |
| 2010/0274430 A1 * | 10/2010 | Dolgov et al. | ................... | 701/25 |
| 2010/0295668 A1 * | 11/2010 | Kataoka | ........................ | 340/435 |
| 2010/0332050 A1 * | 12/2010 | Kobayashi | ....................... | 701/1 |

(Continued)

*Primary Examiner* — Calvin Cheung
*Assistant Examiner* — Krishnan Ramesh
(74) *Attorney, Agent, or Firm* — McDonnell Boehnen Hulbert & Berghoff LLP (57) ABSTRACT

Methods and systems for modifying vehicle behavior based on confidence in lane estimation are described. In an example, a computing device may be configured to receive lane information relating to locations of lane boundaries and may be configured to estimate a lane boundary on a road on which the vehicle is traveling, based on the lane information. The computing device also may be configured to determine a level of confidence for the estimated lane boundary, modify a driving behavior for the vehicle based on the level of confidence, and also may be configured to control the vehicle based on the modified driving behavior.

20 Claims, 6 Drawing Sheets

(56) References Cited

U.S. PATENT DOCUMENTS

| | | | |
|---|---|---|---|
| 2011/0060524 A1* | 3/2011 | Miyajima et al. | 701/300 |
| 2011/0169958 A1* | 7/2011 | Imai et al. | 348/149 |
| 2011/0184605 A1* | 7/2011 | Neff | 701/25 |
| 2011/0301813 A1* | 12/2011 | Sun et al. | 701/41 |
| 2012/0022739 A1* | 1/2012 | Zeng | 701/29 |
| 2012/0062747 A1* | 3/2012 | Zeng | 348/149 |
| 2012/0081234 A1* | 4/2012 | Shaffer et al. | 340/905 |
| 2012/0083960 A1* | 4/2012 | Zhu et al. | 701/23 |
| 2012/0264376 A1* | 10/2012 | Breed | 455/66.1 |
| 2012/0283895 A1* | 11/2012 | Noda | 701/1 |
| 2012/0323473 A1* | 12/2012 | Irie et al. | 701/117 |
| 2013/0006478 A1* | 1/2013 | Lin | 701/49 |

\* cited by examiner

COMPUTER PROGRAM PRODUCT 500

SIGNAL BEARING MEDIUM 501

PROGRAM INSTRUCTIONS 502

- RECEIVING, AT A COMPUTING DEVICE THAT IS CONFIGURED TO CONTROL AN VEHICLE, LANE INFORMATION RELATING TO LOCATIONS OF LANE BOUNDARIES

- ESTIMATING, USING THE COMPUTING DEVICE, A LANE BOUNDARY ON A ROAD ON WHICH THE VEHICLE IS TRAVELING, BASED ON THE LANE INFORMATION

- DETERMINING, USING THE COMPUTING DEVICE, A LEVEL OF CONFIDENCE FOR THE ESTIMATED LANE BOUNDARY

- MODIFYING, USING THE COMPUTING DEVICE, A DRIVING BEHAVIOR FOR THE VEHICLE SUCH THAT A DEGREE OF ADHERENCE TO THE ESTIMATED LANE BOUNDARY IS BASED ON THE DETERMINED LEVEL OF CONFIDENCE

- CONTROLLING, USING THE COMPUTING DEVICE, THE VEHICLE IN ACCORDANCE WITH THE MODIFIED DRIVING BEHAVIOR

| COMPUTER READABLE MEDIUM 503 | COMPUTER RECORDABLE MEDIUM 504 | COMMUNICATIONS MEDIUM 505 |

FIGURE 5

MODIFYING VEHICLE BEHAVIOR BASED ON CONFIDENCE IN LANE ESTIMATION

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to modifying vehicle behavior based on confidence in lane estimation. In one aspect, the present application describes a method. The method may comprise receiving, at a computing device that is configured to control a vehicle, lane information relating to locations of lane boundaries. The method also may comprise estimating, using the computing device, a lane boundary on a road on which the vehicle is traveling, based on the lane information. The method may further comprise determining, using the computing device, a level of confidence for the estimated lane boundary. The method also may comprise modifying, using the computing device, a driving behavior for the vehicle such that a degree of adherence to the estimated lane boundary is based on the determined level of confidence and further may comprise controlling, using the computing device, the vehicle in accordance with the modified driving behavior.

In another aspect, the present application describes a control system for a vehicle. The control system may comprise one or more sensors. The control system also may comprise a computing device that is in communication with the one or more sensors. The computing device may be configured to receive, from the one or more sensors, lane information relating to locations of lane boundaries. The computing device also may be configured to estimate a lane boundary on a road on which the vehicle is traveling, based on the lane information. The computing device also may be configured to determine a level of confidence for the estimated lane boundary. The computing device further may be configured to modify a driving behavior for the vehicle such that a degree of adherence to the estimated lane boundary is based on the determined level of confidence. The computing device also may be configured to control the vehicle in accordance with the modified driving behavior.

In still another aspect, the present application describes a non-transitory computer readable medium having stored thereon instructions executable by a computing device of a vehicle to cause the computing device to perform functions. The functions may comprise receiving lane information relating to locations of lane boundaries. The functions may also comprise estimating a lane boundary on a road on which the vehicle is traveling, based on the lane information. The functions may further comprise determining a level of confidence for the estimated lane boundary. The functions may also comprise modifying a driving behavior for the vehicle such that a degree of adherence to the estimated lane boundary is based on the determined level of confidence. The functions may further comprise controlling the vehicle in accordance with the modified driving behavior.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to control a vehicle operating in an autonomous mode. The computing device may be configured to receive, from sensors on the vehicle, lane information relating to locations of lane boundaries and may be configured to estimate a lane boundary on a road on which the vehicle is traveling, based on the lane information. The lane information may include, for example, one or more of map information, position tracking information of one or more vehicles on the road, location information of one or more static objects with respect to the road, lane marker recognition information, and road geometry information. The computing device also may be configured to determine a level of confidence for the estimated lane boundary. The computing device further may be configured to modify a driving behavior for the vehicle such that a degree of adherence to the estimated lane boundary is based on the determined level of confidence, and also may be configured to control the vehicle in accordance with the modified driving behavior.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
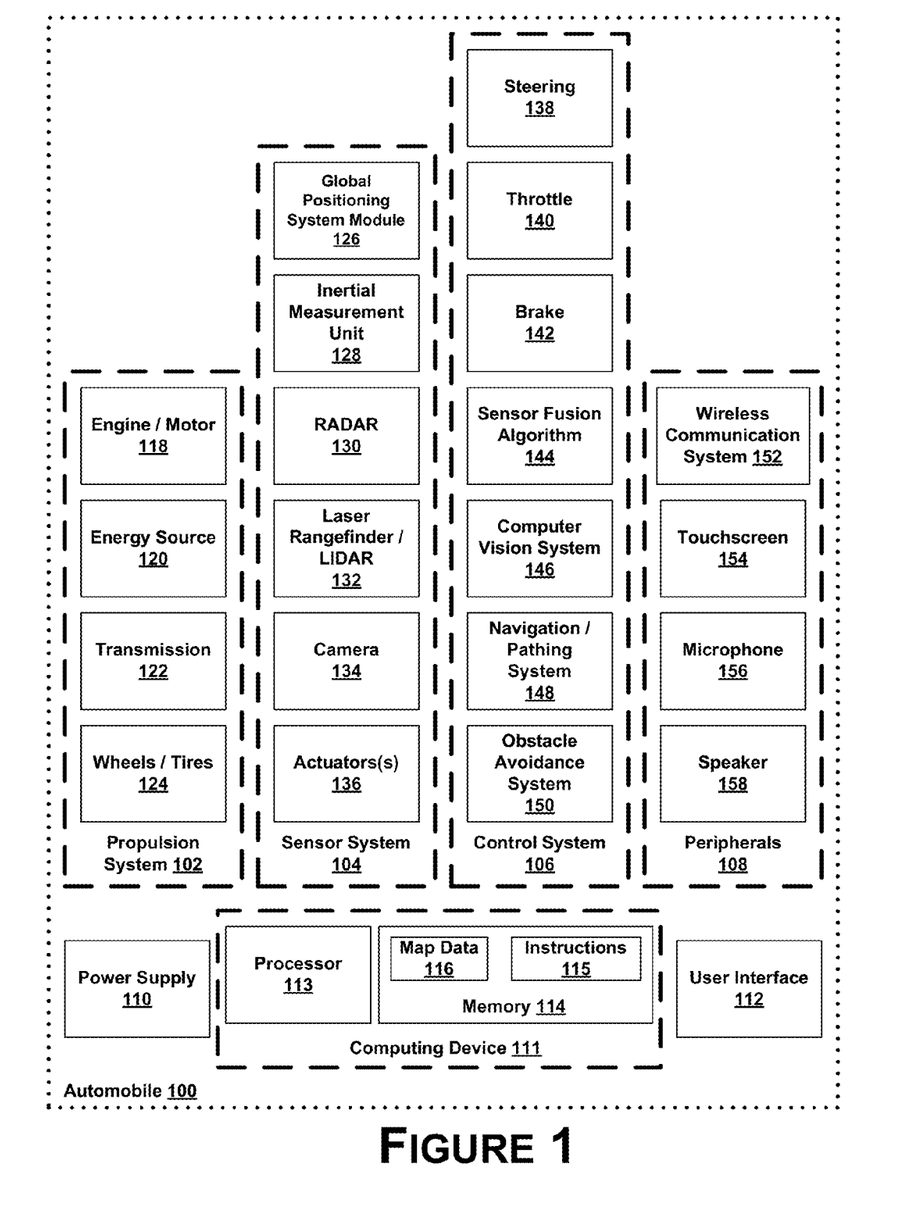
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR 130 unit may be any sensor configured to sense objects in the environment in which the automobile 100 is located using radio signals. In some examples, in addition to sensing the objects, the RADAR unit 130 may additionally be configured to sense the speed and/or direction of motion of the objects.

Similarly, the laser rangefinder or LIDAR unit 132 may be any sensor configured to sense objects in the environment in which the automobile 100 is located using lasers. In particular, the laser rangefinder or LIDAR unit 132 may include a laser source and/or laser scanner configured to emit a laser and a detector configured to detect reflections of the laser. The laser rangefinder or LIDAR 132 may be configured to operate in a coherent (e.g., using heterodyne detection) or an incoherent detection mode.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light, or x-rays. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 may further be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate the speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors. To the extent the processor 113 includes more than one processor; such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
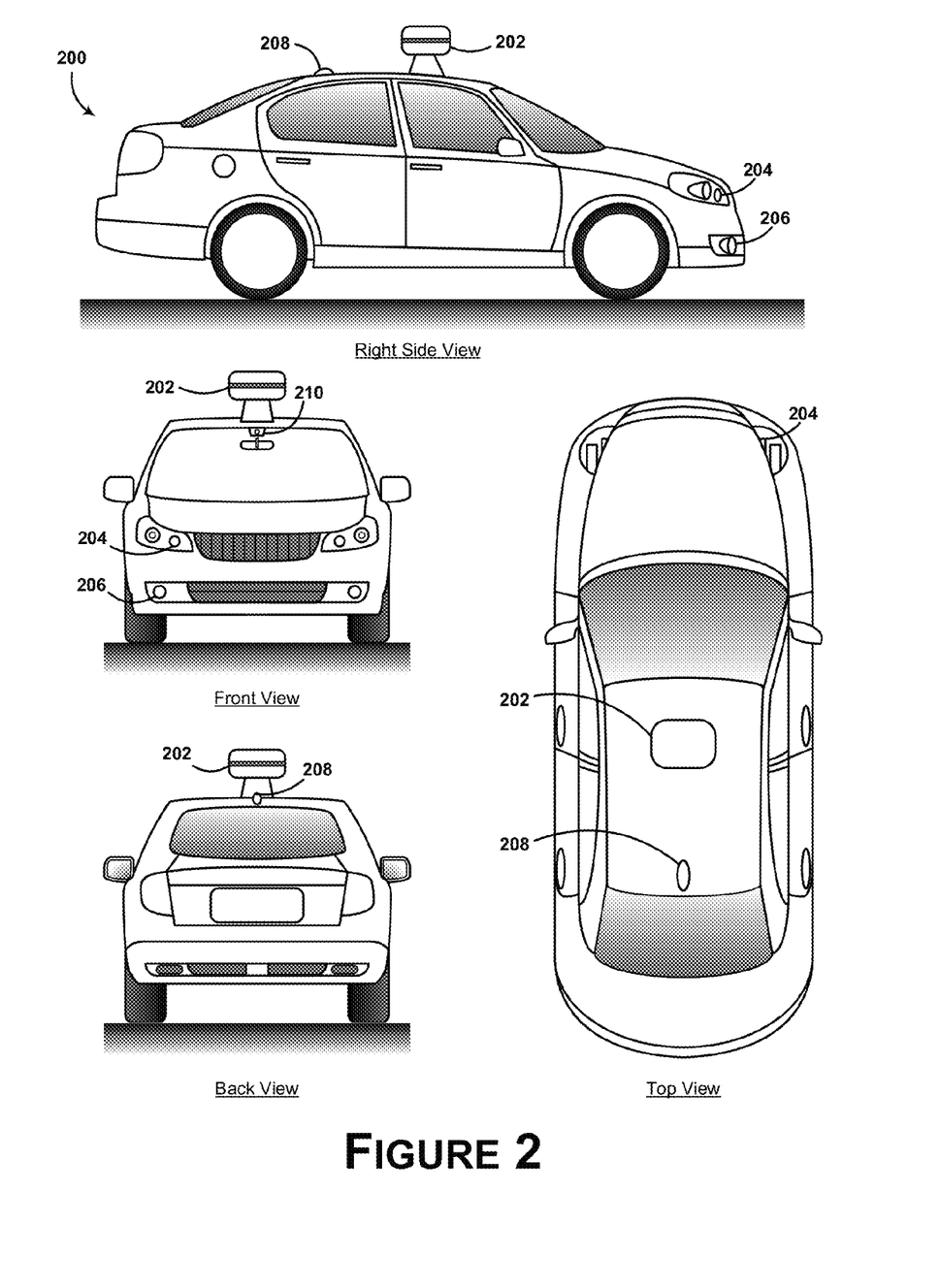
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera may take any of the forms described above. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a given driving behavior from among multiple possible driving behaviors. The control system may be configured to receive information from sensors coupled to the automobile 200 (on or off the automobile 200), modify a driving behavior based on the information, and control the automobile 200 in accordance with the modified driving behavior. The control system further may be configured to continuously monitor the information received from the sensors to continuously evaluate driving conditions and also may be configured to modify the driving behavior or select another driving behavior based on changes in the driving conditions.

Figure 3:
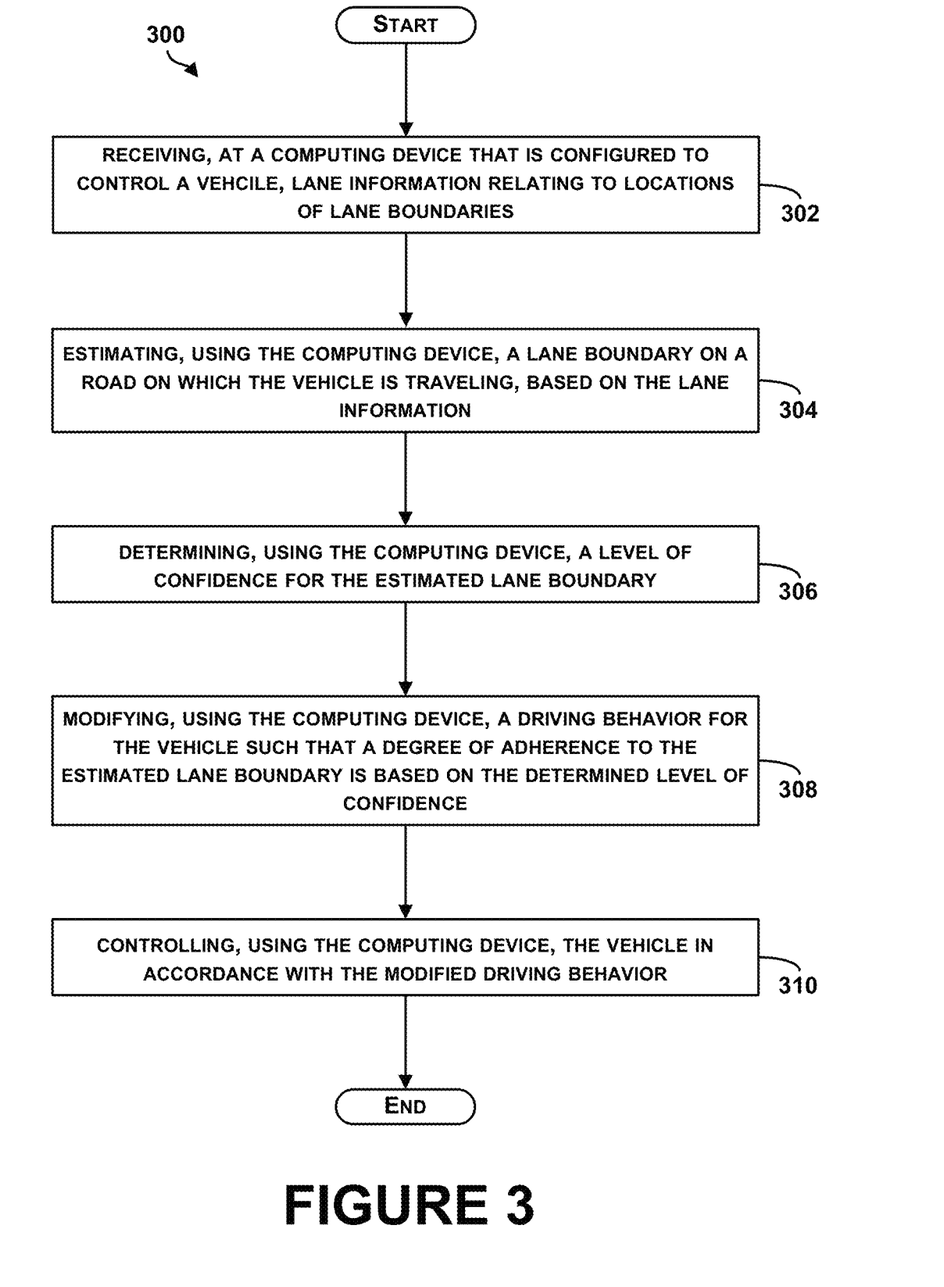
FIG. 3 is a flow chart of a method for modifying behavior of a vehicle based on confidence in lane estimation, in accordance with an example embodiment.

FIG. 3 is a flow chart illustrating a method 300 for modifying behavior of a vehicle (e.g., the automobile 100 or 200) based on confidence in lane estimation.

The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device that is configured to control a vehicle, lane information relating to locations of lane boundaries. The computing device may be onboard the vehicle or may be off-board but in wireless communication with the vehicle, for example. The computing device may be configured to control the vehicle in an autonomous or semi-autonomous operation mode. The computing device may be configured to receive, from sensors coupled to the vehicle, information associated with, for example, condition of systems and subsystems of the vehicle, driving condition, road condition, etc.

For example, the computing device may be configured to receive lane information relating to locations of lane boundaries. The lane information may comprise one or more information types. For example, the lane information may comprise map information received from a GPS module coupled to the vehicle. The map information may include information associated with a number of lanes, locations of lane boundaries, etc. The map information may be accurate; however, the map information may not include information relating to recent changes to road structure or temporary road work that may cause changes to road lanes (e.g., number of lanes or the locations of lane boundaries may change).

In another example, the lane information may include position tracking information of one or more vehicles on the road. Tracking positions and trajectories of other vehicles on the road may provide information relating to the locations of lane boundaries on the road. In one example, the lane information may comprise information associated with locations of static objects with respect to the road (e.g., curbs, shoulders, etc.) and the information may be used to infer road structure, the locations of lane boundaries, etc.

In an example, the lane information also may comprise road geometry information. The road geometry information may be received at the computing device from sensors (e.g., a camera) coupled to the vehicle.

In still another example, the lane information may comprise images of the road depicting lane markers, where the images may be received, from a camera coupled to the vehicle, at the computing device controlling the vehicle.

In yet another example, an electromagnetic radiation source may be coupled to the vehicle, and may be configured to emit waves of a given frequency or multiple frequencies on the road. The electromagnetic radiation source may be any type of a light source, visible or invisible. In an example, the electromagnetic radiation source may include a laser source. The lane information may comprise information provided by sensors coupled to the vehicle, where the sensors may be configured to receive a reflection of the emitted electromagnetic (e.g., laser) waves from the road. Properties of the reflected waves may be indicative of the locations of lane boundaries.

These examples of the types of lane information are for illustration only and other types are possible.

At block 304, the method 300 includes estimating, using the computing device, a lane boundary on a road on which the vehicle is traveling, based on the lane information. Based on the lane information that may include one or more of the types of information described above, the computing device may be configured to estimate lane boundaries of lanes on the road on which the vehicle is travelling.

For example, the computing device may be configured to estimate a location of a lane boundary based on location information received through the GPS module in combination with map data.

In another example, the computing device may be configured to identify, using image recognition techniques known in the art, lane markers in an image of the road received through a camera coupled to the vehicle.

In yet another example, the computing device may be configured to estimate the location of lane boundary based on intensity of waves emitted by the electromagnetic radiation source and reflected on the road. As an example, intensity of respective waves reflected off of lane markers may be different that intensity of waves reflected from other parts of the road, and based on difference in intensity, the computing device may be configured to estimate the location of the lane boundary. These examples are for illustration only. Those skilled in the art will appreciate that other algorithms and arrangements and other elements can be used for estimating the location of a given lane boundary.

In some examples, the computing device may be configured to estimate lane boundaries of multiple lanes on the road not only of the lane on which the vehicle is travelling. In these examples, the computing device may be configured to determine a configuration of the road such as: (i) a travel lane on which the vehicle is travelling is the only lane, (ii) a lane to the left of the travel lane may exist, (iii) a lane to the right of the travel lane may exist, and (iv) lanes to the left and to the right of the travel lane may exist.

At block 306, the method 300 includes determining, using the computing device, a level of confidence for the estimated lane boundary. Upon estimating the lane boundary, the computing device further may be configured to determine or assign a level of confidence for the estimated lane boundary. The level of confidence can be qualitative such as "high" or may be numerical such as a number on a scale, for example. Other examples are possible.

In an example, the computing device may be configured to receive accurate map information associated with the road on which the vehicle is travelling and, assuming no changes to the road, the computing device may be configured to assign or determine a high level of confidence for the lane boundary estimated based on the map information.

In another example, the computing device may be configured to determine a clarity metric for a lane marker on the road. The clarity metric, for example, may be a function of clarity of the lane marker in an image of the road, or a function of intensity of reflected waves on the road. The level of confidence may be a function of the clarity metric, for example.

In still another example, the computing device may be configured to receive, as input, curve fragments corresponding to potential lane boundary observations, such as those detected in an image or based on intensity of reflected waves as described above. While some of the curve fragments may be true observations of the road and lanes, some may arise from tree shadows or lens flare, and others may be due to painted markings that may not correspond to lane boundaries (e.g., crosswalk stripes, parking spot delimiters, or stop lines). The computing device may be configured to use a probabilistic model (e.g., a Gaussian distribution) to model uncertainty of estimated lane curve geometries and boundaries. Further, the computing device may be configured to determine or assign the level of confidence for lane estimation based on the probability model.

In one example, the computing device may be configured to assign or determine a respective level of confidence for each type of information (e.g., map information, position tracking information of one or more vehicles on the road, lane markers recognition information, reflected waves, road geometry, etc.) and further may be configured to determine a single level of confidence based on respective levels of confidence.

At block 308, the method 300 includes modifying, using the computing device, a driving behavior for the vehicle such that a degree of adherence to the estimated lane boundary is based on the determined level of confidence. The computing device may be configured to modify a given driving behavior based on the estimated lane boundary as well as the determined level of confidence for the estimated lane boundary.

The control system of the vehicle may comprise multiple driving behaviors that may be predetermined or adaptive to changes in a driving environment of the vehicle. Generally a driving behavior may comprise sets of rules associated with traffic interaction in various driving contexts such as lane driving. The driving behavior may comprise rules that determine a speed of the vehicle and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, in a lane driving situation, the computing device may be configured to modify or select, based on the determined level of confidence, a driving behavior comprising rules for actions that control the vehicle speed and tracking lane to safely maintain a distance with other objects and select a lane that is considered safest.

As an example, the computing device may be configured to drive the vehicle in a given lane and configured to receive from sensors coupled to the vehicle information associated with a given automobile that may be approaching a given side of the vehicle. If a high level of confidence is determined for lane boundaries of a lane the vehicle is travelling on, the computing device may select a driving behavior that may cause the vehicle to stay within the lane. However, if the level of confidence is low, the computing device may be configured to modify the driving behavior to cause the vehicle to move away—after evaluating other safety concerns—and/or reduce the speed of the vehicle, for example. Therefore, when the determined level of confidence is low (e.g., below a given threshold), the computing device may be configured to modify the driving behavior to give more weight to other inputs (e.g., location of other vehicles on the road) than to the estimated lane boundary.

In an example, a first driving behavior may comprise a default driving behavior and a second driving behavior may comprise a defensive driving behavior. Characteristics of a the defensive driving behavior may comprise, for example, following another vehicle, maintaining a predetermined safe distance with other vehicles that may be larger than a distance maintained in the default driving behavior, turning-on lights, reducing a speed of the vehicle, and following an estimated centerline of a lane. In this example, the computing device of the vehicle may be configured to compare the determined level of confidence of the estimated lane boundary to a threshold level of confidence, and the computing device may be configured to select the first or the second driving behavior, based on the comparison. For example, if the determined level of confidence is less than the threshold level of confidence, the computing device may be configured to select the second driving behavior (e.g., the defensive driving behavior). If the determined level of confidence is greater than the threshold level of confidence, the computing device may be configured to modify the driving behavior to the first driving behavior (e.g., select the default driving behavior).

In yet another example, alternatively or in addition to transition between discrete driving behaviors (e.g., the first driving behavior and the second driving behavior) the computing device may be configured to select from a continuum of driving modes or states based on the determined level of confidence. In still another example, the computing device may be configured to select a discrete driving behavior and also may be configured to select a driving mode from a continuum of driving modes within the selected discrete driving behavior. In this example, a given driving behavior may comprise multiple sets of driving rules, where a set of driving rules describe actions for control of speed and direction of the vehicle. The computing device further may be configured to cause a smooth transition from a given set of driving rules to another set of driving rules of the multiple sets of driving rules, based on the determined level of confidence. A smooth transition may indicate that the transition from the given set of rules to another may not be perceived by a passenger in the vehicle as a sudden or jerky change in a speed or direction of the vehicle, for example.

In an example, a given driving behavior may comprise a program or computer instructions that characterize actuators controlling the vehicle (e.g., throttle, steering gear, brake, accelerator, or transmission shifter) based on the determined level of confidence. The given driving behavior may include action sets ranked by priority, and the action sets may include alternative actions that the vehicle may take to accomplish a task (e.g., driving from one location to another). The alternative actions may be ranked based on the determined level of confidence, for example. The computing device may be configured to select an action to be performed and, optionally, modified based on the determined level of confidence.

In another example, multiple driving behaviors (e.g., programs) may continuously propose actions to the computing device. The computing device may be configured to decide which behavior may be selected or configured to modify the driving behaviour based on a weighted set of goals (safety, speed, etc.), for example. Weights of the weighted set of goals may be a function of the determined level of confidence. Based on an evaluation of the weighted set of goals, the computing device, for example, may be configured to rank the multiple driving behaviors and respective action sets and select or modify a given behavior and a respective action set based on the ranking.

As an example, assuming a high level of confidence in estimation of lane boundaries, the computing device may be configured to modify the driving behavior to cause the vehicle to: (i) maintain a maximum speed possible in a given segment of the road, (ii) maintain safe distances with respect to other vehicles, (iii) reach a target (e.g., a location) at a desired lane and at a desired speed, and (iv) merge into the desired lane with sufficient spacing so as to not violate spacing rules relative to other vehicles in the desired lane or in neighboring lanes.

These examples and driving situations are for illustration only. Other examples and driving behaviors are possible as well.

At block 310, the method 300 includes controlling, using the computing device, the vehicle in accordance with the modified driving behavior. In an example, the computing device may be configured to control actuators of the vehicle using an action set or rule set associated with the modified driving behavior. For instance, the computing device may be configured to adjust translational velocity, or rotational velocity, or both, of the vehicle based on the modified driving behavior.

As an example, controlling the vehicle may comprise determining a desired path of the vehicle, based on the estimated lane boundary. In one example, the computing device may have determined a high level of confidence for the estimated lane boundary, and may accordingly take into account the lane boundary as a hard constraint. Taking the estimated lane boundary into account as a hard constraint may indicate that the computing device may be configured to cause the vehicle to strictly adhere to the estimated lane boundary when determining the desired path, for example. For instance, the computing device may be configured to control the vehicle to travel strictly within lane boundaries.

In another example, accurate or updated map information may not be available and the computing device may be configured to estimate the lane boundary based on other information (e.g., road images, trajectories of other vehicles, lane markers recognition etc.). In some examples, lane markers may be obscured or may not exist on a given road, or other vehicles may not be in a close vicinity of the vehicle being controlled by the computing device, or weather conditions may affect accurate sensor detection of the road characteristics, and accordingly the computing device may be configured to determine or assign a low level of confidence for the estimated lane boundary. In these examples, the computing device may be configured to take the estimated lane boundary as a soft constraint when determining the desired path.

Taking the estimated lane boundary into account as a soft constraint may indicate that the computing device may be configured to adhere to the estimated lane boundary to a degree proportional to the determined level of confidence, when determining the desired path, for example. Thus, a high level of confidence may indicate a higher degree of adherence to the estimated lane boundary (i.e., a lower degree of disregarding of the estimated lane boundary), for example. Similarly, a low level of confidence may indicate a lower degree of adherence to the estimated lane boundary (i.e., a higher degree of disregarding of the estimated lane boundary), for example.

As an example, the computing device may be configured to control the vehicle such that the vehicle may cross the estimated lane boundary and may not stay strictly within an associated lane, if another safer path is determined. In another example, the computing device may be configured to control the vehicle such that the vehicle follows a centerline of the estimated lane and stay away from associated lane boundaries due to the low level of confidence determined for the estimated lane boundaries. In still another example, in a situation when a low level of confidence is determined for a given lane estimation, the computing device may be configured to use geometric information associated with curbs and road shoulders, for example, to bias the vehicle towards a center of the road. In yet another example of a low level of confidence in lane estimation, the computing device may be configured to keep to a right of an estimated lane and take into account position of approaching oncoming vehicles.

Therefore, in addition to or alternative to having a discrete transition from using the estimated lane boundary as a hard constraint to using the estimated lane boundary as a soft constraint based on a threshold confidence level, the computing device may be configured to control the vehicle in a continuous smooth operation. For example, the determined level of confidence in the estimated lane boundary may be used as a factor, among other factors, indicative of a degree to which the vehicle may abide by or adhere to the estimated lane boundaries.

Figure 4A:
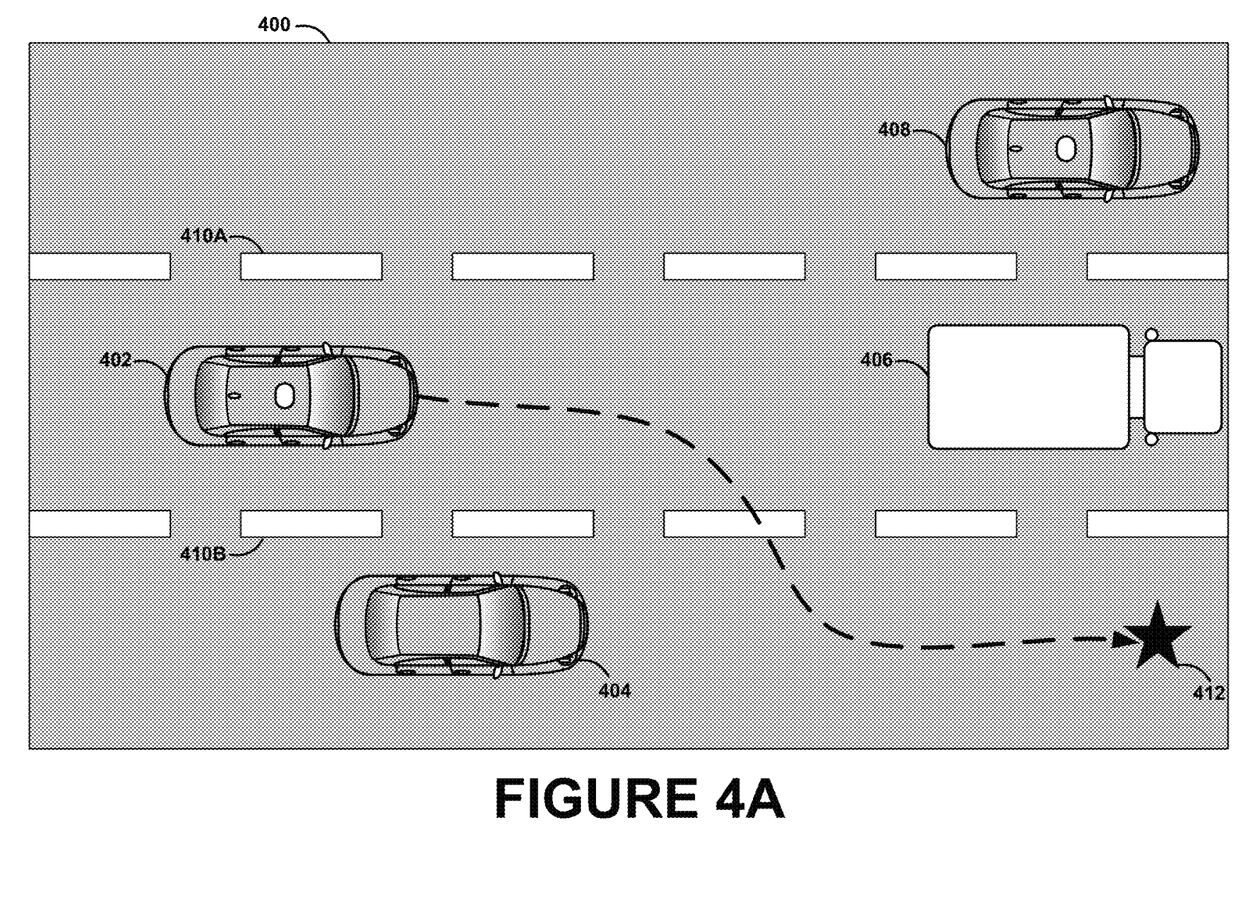
FIG. 4A illustrates an example of controlling an automobile, based on a high level of confidence in lane estimation, in accordance with an example embodiment.

FIG. 4A illustrates an example of controlling an automobile, based on a high confidence in lane estimation, in accordance with an example embodiment. FIG. 4A illustrates a road 400 having three lanes, an automobile 402 travelling on a middle lane on the road 400 and being controlled by a computing device and may be operating in an autonomous or semi-autonomous mode. Other vehicles travelling on the road are a first automobile 404, a truck 406, and a second automobile 408. Lane markers such as lane markers 410A and 410B define the three lanes on the road. The computing device controlling the automobile 402 may be configured to receive lane information (e.g., map information, lane markers 410A-B recognition information, etc.) and may be configured to estimate locations of the lane boundaries, based on the lane information. In an example, map information that provides accurate lane information may be received at the computing device. In another example, lane markers 410A-B recognition information may define the locations of the lane boundaries with a high probability. Accordingly, the computing device may be configured to determine or assign a high level of confidence for the estimated lane boundaries.

The computing device may be configured to control or drive the automobile 402 from a position shown in FIG. 4A to a target location 412 marked by a star. Because of the high level of confidence for the estimated lane boundaries, the computing device may be configured to control the automobile such that the a speed of the automobile 402 is a maximum speed possible according to traffic rules on the road 400, cause the automobile 402 follows traffic rules associated with lane changing (e.g., maintain safe distances with other vehicles such as the automobile 404 and the truck 406), and cause the automobile 402 reach the target location 412 at a desired speed, for example.

Figure 4B:
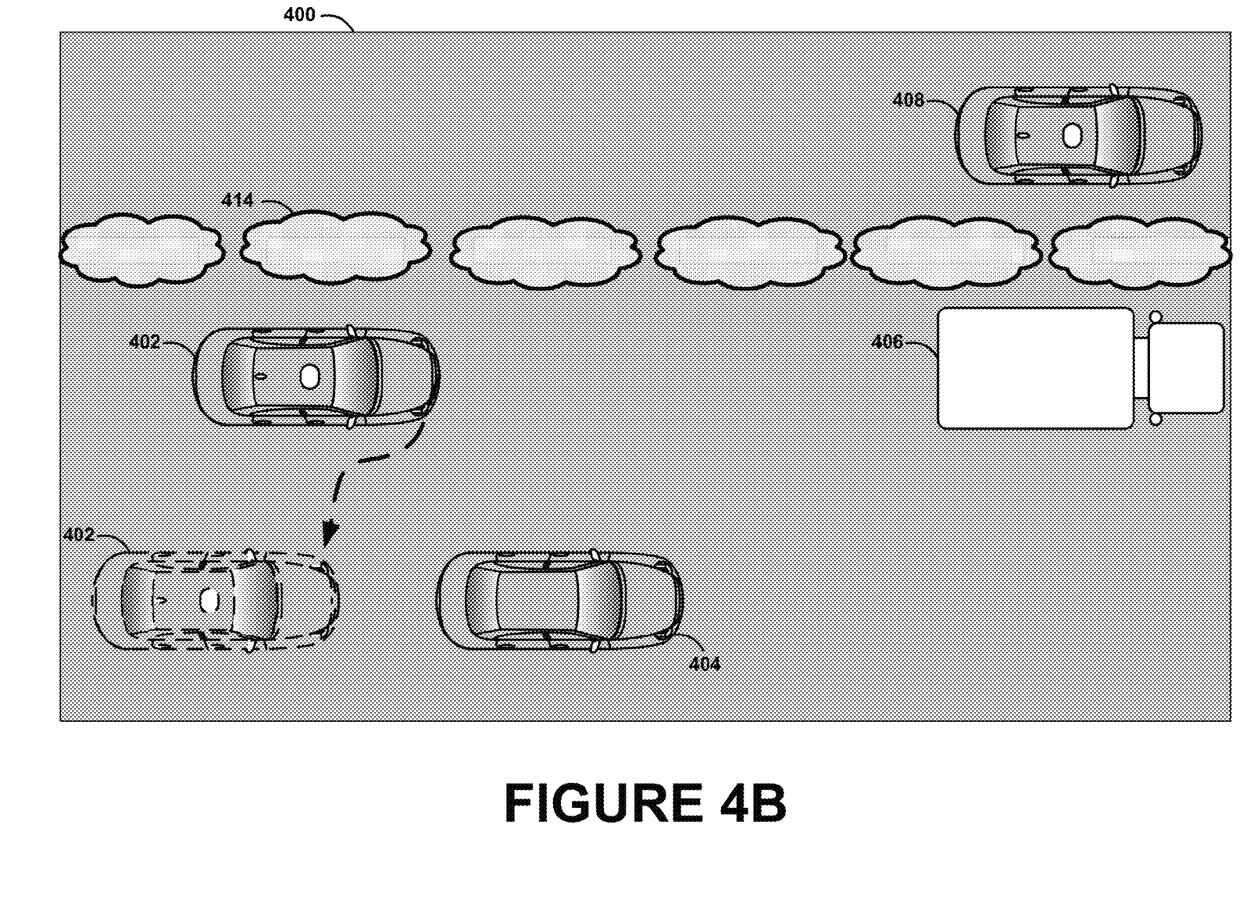
FIG. 4B illustrates an example of controlling an automobile, based on a low level of confidence in lane estimation, in accordance with an example embodiment.

FIG. 4B illustrates an example of controlling an automobile, based on a low level of confidence in lane estimation, in accordance with an example embodiment. As shown in FIG. 4B, the automobile 402 may enter a region of the road 400 that may not have lane markers (e.g., lane markers such as the lane marker 410B are non-existent) or the lane markers may be obscured, such that one or more sensors of the automobile 402 detect obscurities 414. Accordingly, the computing device may be configured to estimate the locations of lane boundaries on the road 400 based on trajectories of other vehicles (e.g., the automobile 406 and the truck 406) and may determine or assign a low level of confidence to the estimated lane boundaries, for example. The computing device may be configured to modify a driving behavior of the automobile 402 accordingly. For example, the computing device may be configured to control the automobile 402 based on a defensive driving behavior that may comprise reducing a speed of the automobile 402, shifting to a position behind the automobile 404, and following the automobile 404 while keeping a predetermined safe distance, as shown in FIG. 4B.

These control actions and driving situations are for illustration only. Other actions and situations are possible as well.

Figure 5:
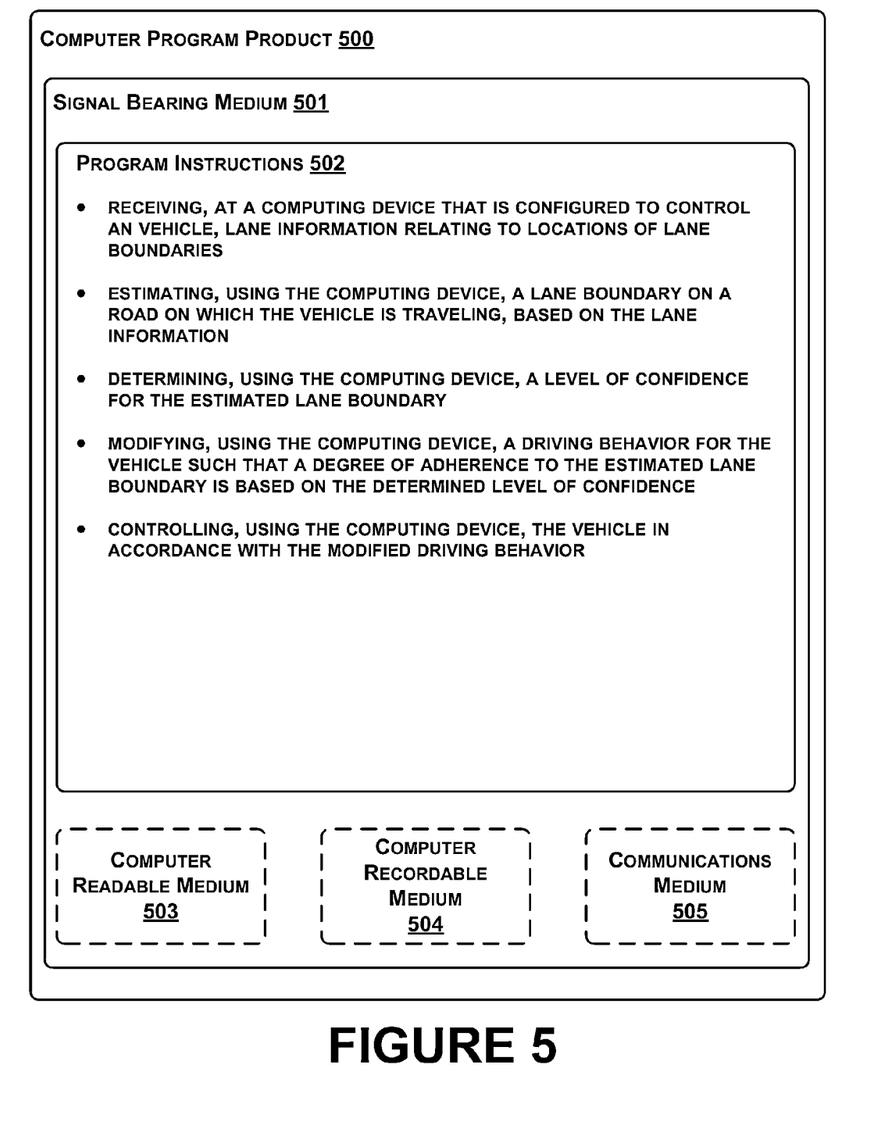
FIG. 5 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors may provide functionality or portions of the functionality described above with respect to FIGS. 1-4. Thus, for example, referring to the embodiments shown in FIG. 3, one or more features of blocks 302-310 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1, 2, and 3 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving, by a computing device, map information indicative of lane boundaries on a road on which a vehicle is travelling;
   determining, by the computing device, that the map information indicative of the lane boundaries on the road is unreliable;
   in response to determining that the map information is unreliable, receiving additional lane information from at least one on-board sensor coupled to the vehicle;
   estimating, by the computing device, the lane boundaries based on the additional lane information;
   determining a level of confidence for the estimated lane boundaries based on the additional lane information; and
   determining, by the computing device, a path for the vehicle based on the level of confidence and the estimated lane boundaries.

2. The method of claim 1, wherein the additional lane information comprises one or more of:
   (i) position tracking information of one or more vehicles on the road;
   (ii) location information of one or more static objects with respect to the road;
   (iii) lane marker recognition information; and
   (iv) road geometry information.

3. The method of claim 1, wherein determining the path for the vehicle comprises:
   causing the vehicle to follow a center of a given lane such that a degree of adherence of the vehicle to the center of the given lane is proportional to the level of confidence; and
   taking the estimated lane boundaries into account as a soft constraint that is violable.

4. The method of claim 1, wherein estimating the lane boundaries based on the additional lane information received from the at least one on-board sensor comprises identifying a lane marker based on the additional lane information, and wherein determining the level of confidence for the estimated lane boundaries comprises determining a metric of clarity for the lane marker.

5. The method of claim 1, wherein the additional lane information comprises multiple information types received from respective multiple sources of information, and wherein determining the level of confidence for the estimated lane boundaries based on the additional lane information comprises:
   determining, for each information type received from a respective source of information, a corresponding level of confidence for the estimated lane boundaries; and
   determining the level of confidence for the estimated lane boundaries based on corresponding levels of confidence determined for the multiple sources of information.

6. The method of claim 1, wherein the additional lane information received from the at least one on-board sensor includes at least position tracking information of a given vehicle in a vicinity of the vehicle, wherein the position tracking information indicates a trajectory of travel of the given vehicle, and wherein estimating the lane boundaries based on the additional lane information comprises:
   estimating the lane boundaries based on the trajectory of travel of the given vehicle.

7. The method of claim 1, wherein the computing device is configured to control the vehicle in an autonomous mode of operation.

8. A system, comprising:
   at least one sensor coupled to a vehicle;
   at least one processor in communication with the at least one sensor; and
   data storage comprising instructions that, when executed by the at least one processor, cause the system to perform functions comprising:
      receiving map information indicative of lane boundaries on a road on which the vehicle is travelling;
      determining that the map information indicative of the lane boundaries on the road is unreliable;

in response to determining that the map information is unreliable, receiving additional lane information from the at least one sensor;
estimating the lane boundaries based on the additional lane information;
determining a level of confidence for the estimated lane boundaries based on the additional lane information; and
determining a path for the vehicle based on the level of confidence and the estimated lane boundaries.

9. The system of claim 8, further comprising a Global Position System (GPS) sensor coupled to the vehicle, the functions further comprising:
receiving location information from the GPS sensor, wherein the map information is based on the location information.

10. The system of claim 8, wherein the additional lane information comprises one or more of:
(i) position tracking information of one or more vehicles on the road;
(ii) location information of one or more static objects with respect to the road;
(iii) lane marker recognition information; and
(iv) road geometry information.

11. The system of claim 8, wherein the function of determining the path for the vehicle comprises:
causing the vehicle to follow a center of a given lane such that a degree of adherence of the vehicle to the center of the given lane is proportional to the level of confidence; and
taking the estimated lane boundaries into account as a soft constraint that is violable.

12. The system of claim 8, wherein the at least one sensor includes an image-capture device, wherein the additional lane information comprises image information received from the image-capture device, and wherein the function of estimating the lane boundaries based on the additional lane information comprises:
identifying a lane marker based on the image information, and wherein the function of determining the level of confidence for the estimated lane boundaries comprises determining a metric of clarity of the lane marker.

13. The system of claim 8, wherein the additional lane information comprises multiple information types received from respective multiple sources of information, and wherein the function of determining the level of confidence for the estimated lane boundaries based on the additional lane information comprises:
determining, for each information type received from a respective source of information, a corresponding level of confidence for the estimated lane boundaries; and
determining the level of confidence for the estimated lane boundaries based on corresponding levels of confidence determined for the multiple sources of information.

14. The system of claim 8, wherein the additional lane information includes at least position tracking information of a given vehicle in a vicinity of the vehicle, wherein the position tracking information indicates a trajectory of travel of the given vehicle, and wherein the function of estimating the lane boundaries based on the additional lane information comprises:
estimating the lane boundaries based on the trajectory of travel of the given vehicle.

15. A non-transitory computer readable medium having stored thereon instructions that, when executed by a computing device, cause the computing device to perform functions comprising:
receiving map information indicative of lane boundaries on a road on which a vehicle is travelling;
determining that the map information indicative of the lane boundaries on the road is unreliable;
in response to determining that the map information is unreliable, receiving additional lane information from an on-board sensor coupled to the vehicle;
estimating the lane boundaries based on the additional lane information;
determining a level of confidence for the estimated lane boundaries based on the additional lane information; and
determining a path for the vehicle based on the level of confidence and the estimated lane boundaries.

16. The non-transitory computer readable medium of claim 15, wherein the additional lane information comprises multiple information types received from respective multiple sources of information, and wherein the multiple information types comprise one or more of:
(i) position tracking information of one or more vehicles on the road;
(ii) location information of one or more static objects with respect to the road;
(iii) lane marker recognition information; and
(iv) road geometry information.

17. The non-transitory computer readable medium of claim 15, wherein the function of determining the path for the vehicle comprises:
causing the vehicle to follow a center of a given lane such that a degree of adherence of the vehicle to the center of the given lane is proportional to the level of confidence; and
taking the estimated lane boundaries into account as a soft constraint that is violable.

18. The non-transitory computer readable medium of claim 15, wherein the additional lane information comprises multiple information types received from respective multiple sources of information, and wherein the function of determining the respective level of confidence for the estimated lane boundaries based on the additional lane information comprises:
determining, for each information type received from a respective source of information, a corresponding level of confidence for the estimated lane boundaries; and
determining the level of confidence for the estimated lane boundaries based on corresponding levels of confidence determined for the multiple sources of information.

19. The non-transitory computer readable medium of claim 15, wherein the additional lane information received from the on-board sensor includes at least position tracking information of a given vehicle in a vicinity of the vehicle, wherein the position tracking information indicates a trajectory of travel of the given vehicle, and wherein the function of estimating the lane boundaries based on the additional lane information comprises:
estimating the lane boundaries based on the trajectory of travel of the given vehicle.

20. The non-transitory computer readable medium of claim 15, wherein the additional lane information comprises image information captured by the on-board sensor, wherein the function of estimating the lane boundaries on the road comprises identifying a lane marker based on the image information, and wherein the function of determining the level of confidence for the estimated lane boundaries comprises determining a metric of clarity of the lane marker.

* * * * *